United States Patent [19]

Cocuzza et al.

[11] 4,091,864
[45] May 30, 1978

[54] PROCESS FOR THE CONVERSION, CONVEYANCE AND UTILIZATION OF ENERGY

[75] Inventors: Gioacchino Cocuzza, Catania; Giorgio Beghi, Varese, both of Italy

[73] Assignee: Societa' Italiana Resine S.I.R. S.p.A., Milan, Italy

[21] Appl. No.: 685,608

[22] Filed: May 12, 1976

[30] Foreign Application Priority Data

May 13, 1975 Italy .................................. 23257/75

[51] Int. Cl.$^2$ ............................................. F28D 15/00
[52] U.S. Cl. ............................................. 165/1; 62/4; 423/539; 126/263; 165/DIG. 17
[58] Field of Search ................. 62/4; 165/1, DIG. 17; 423/539; 126/263

[56] References Cited

U.S. PATENT DOCUMENTS 3,005,687  10/1961  Udy .................................. 423/539 X

OTHER PUBLICATIONS

Hanneman et al., 9th Intersociety Energy Conversion Engineering Conference, pub. by American Society of Mechanical Engineers, N.Y., 1974, pp. 435-441.

*Primary Examiner*—Leland A. Sebastian
*Attorney, Agent, or Firm*—Sughrue, Rothwell, Mion, Zinn and Macpeak

[57] ABSTRACT

An energy conversion, conveyance and utilisation system, particularly for providing process heat in industrial plants, which makes use of a source of heat such as a nuclear reactor to dissociate sulfur trioxide according to the reaction:

$$2SO_3 \rightleftarrows 2SO_2 + O_2,$$

the dissociation products being conveyed through a pipeline to a remote utilization station where the heat of recombination is utilized, the resulting sulfur trioxide being returned through the pipeline to the reactor site. The pipeline incorporates separate pipes in which the sulfur dioxide and sulfur trioxide are conducted in liquefied form, surrounded by a duct in which the gaseous oxygen flows.

3 Claims, 4 Drawing Figures

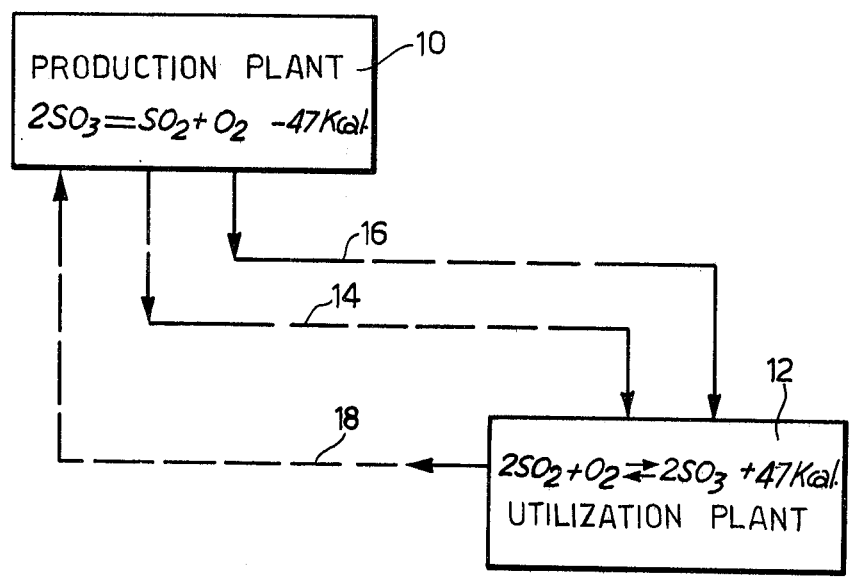
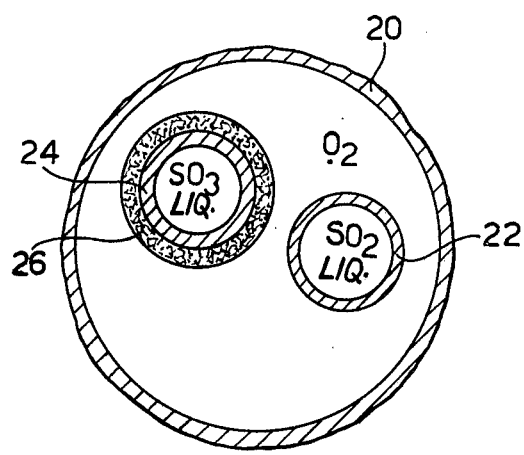

PROCESS FOR THE CONVERSION, CONVEYANCE AND UTILIZATION OF ENERGY

BACKGROUND OF THE INVENTION

The present invention relates to a closed cycle process for the conversion, conveyance and utilization of energy.

A problem which is particularly acute in the petrochemical industry is that of reducing the consumption of mineral oils and natural gas for the generation of process heat as well as of electrical energy.

The only alternate source of energy which has up to now been developed for immediate utilization is the nuclear fission reactor.

The utilization of nuclear reactors as sources of electrical energy in petrochemical complexes does not present any particular difficulties but problems arise in the use of nuclear reactors as sources of process heat.

For economical, ecological and safety reasons, very high power nuclear plants are usually sited at relatively long distances, of the order of several hundred kilometers, from the main centers of utilization. Whereas the conveyance of the electrical energy over these distances is not particularly difficult the conveyance of thermal energy is altogether a different matter.

For example, if high pressure steam is selected as an energy carrier, the conveyance costs are prohibitive over the distances of aforementioned order.

An object of the present invention is to provide a closed cycle process in which thermal energy is transformed in a production plant into chemical dissociation energy by dissociating tubular trioxide according to the reaction:

$$2SO_3 \rightleftarrows 2SO_2 + O_2 - 47 \text{ Kcal},$$

the dissociation products of the reaction are then conveyed to a utilization plant where they are recombined into sulfur trioxide with liberation of the stored chemical energy as heat, and the sulfur trioxide thus produced is returned to the production plant.

A further object of the invention is to provide such a process in which the thermal energy for the dissociation of the sulfur trioxide in the production plant is supplied by a nuclear reactor.

SUMMARY OF THE INVENTION

According to the present invention there is provided a process for the conversion, conveyance and utilization of energy in a closed cycle in which thermal energy is converted, in a production plant, into chemical dissociation energy by dissociating sulfur trioxide according to the reaction:

$$2SO_3 \rightleftarrows 2SO_2 + O_2,$$

the dissociation products of the reaction are conveyed to a utilization plant in which they are recombined into sulfur trioxide, with release of the stored chemical energy as heat, the resulting sulfur trioxide being returned to the production plant, and in which the sulfur dioxide and the sulfur trioxide are conveyed from the production plant to the utilization plant from the utilization plant to the production plant respectively in liquid form.

Preferably, the thermal energy for the dissociation of the sulfur trioxide is produced by a nuclear reactor.

According to another preferred feature of the present invention, the thermal energy released in the utilization plant in the recovery of the sulfur trioxide from its dissociation products is used for the production of high pressure superheated steam.

ADVANTAGES

The process of the present invention is based on the equilibrium reaction:

$$2SO_2 \rightleftarrows 2SO_2 + O_2 - 47 \text{ Kcal},$$

which has the following advantages:
 (a) The thermal levels are in conformity with the necessary requirements: at about 850° C the sulfur trioxide is mostly dissociated and this dissociation occurs within a temperature range sufficiently wide to facilitate thermal coupling with the gaseous cooling circuit of a nuclear reactor of the HTGR type. Furthermore, the temperature range within which the sulfur dioxide and the oxygen recombine allows the generation of high-pressure superheated steam.
 (b) Co-production of oxygen is possible, in which case the oxygen required for the oxidation of the sulfur dioxide in the utilization plant can conveniently be supplied from the atmosphere.
 (c) Sulfur dioxide and sulfur trioxide are easily liquefied, an extremely important point as it allows their conveyance in the liquid state, with consequent reduction in costs as compared with processes involving the conveyance of considerable quantities of gas, such as, for example, that based on the equilibrium reaction:

$$CH_4 + H_2O \rightleftarrows CO + 3H_2.$$

Furthermore, the easy liquefaction of the sulfur dioxide and sulfur trioxide allows their storage in the liquid state, which makes it possible to cope with the possible load fluctuations without any change in the rate of operation of the nuclear reactor.
 (d) The cost of the chemical substances used is low.
 (e) The risk of pollution due to the sulfur dioxide and trioxide may be reduced, especially if the conveyance devices hereinafter described are used.

BRIEF DESCRIPTION OF THE DRAWINGS

One embodiment of the invention will now be more particularly described by way of example, with reference to the accompanying purely diagrammatic drawings in which:

FIG. 1 is a diagrammatic representation of a production plant and a utilization plant for carrying out the process according to the invention;

FIG. 2 is a cross-sectional view of an arrangement of pipes for the conveyance of liquid sulfur dioxide, liquid sulfur trioxide and oxygen between the plants of FIG. 1;

DETAILED DESCRIPTION OF THE ILLUSTRATED EMBODIMENT

Figure 3:
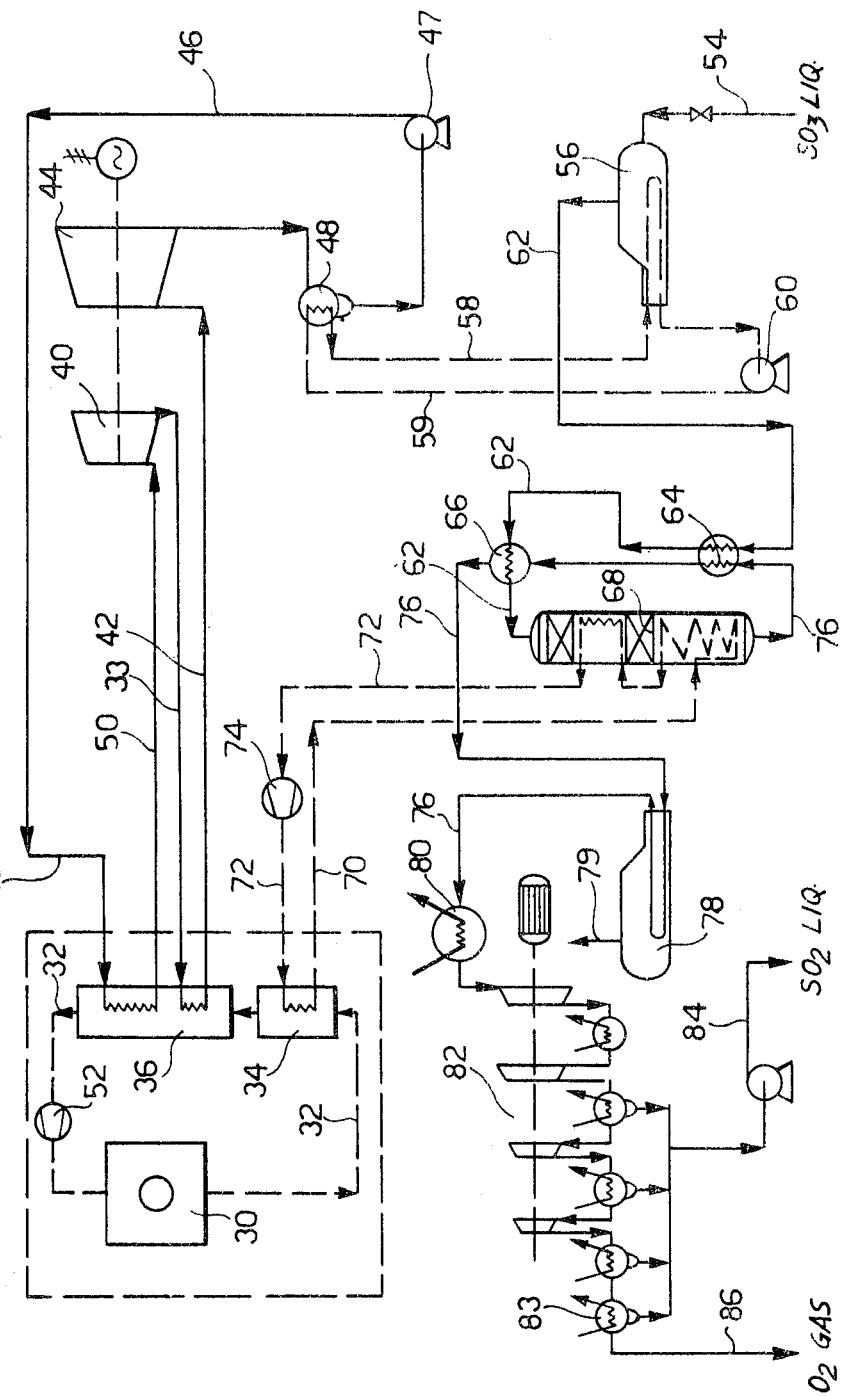
FIG. 3 is a more detailed representation of the production plant of FIG. 1 in which a nuclear reactor of the HTGR type simultaneously produces electrical energy aand thermal energy for the dissociation of sulfur trioxide.

Referring to the drawings, FIG. 1 shows a production plant 10 in which sulfur trioxide is dissociated into sulfur dioxide and oxygen, by means of thermal energy supplied by a nuclear reactor. The sulfur dioxide produced is liquefied, and the oxygen and liquid sulfur dioxide are conveyed along lines 16 and 14 respectively to a utilization plant 12.

In the utilization plant 12 the oxygen and sulfur dioxide are recombined to form sulfur trioxide with consequent release of thermal energy. The sulfur trioxide is then liquefied and conveyed back to the plant 10 through a line 18.

The distance between the two plants 10 and 12 is of the order of 100–200 kms.

Referring to FIG. 2, pipelines for the conveyance of oxygen, liquid sulfur dioxide and liquid sulfur trioxide between the production plant 10 and the utilization plant 12 are shown at 20, 22 and 24 respectively. The pipelines 22 and 24 are located inside the pipeline 20 to reduce danger from any possible leakage from the pipelines 22 and 24.

In order to prevent deposition of solid polymers of sulfur trioxide, the liquid sulfuric trioxide must be maintained at temperatures higher than about 30° C. The pipelines 24, carrying the sulfur trioxide, is therefore surrounded by a jacket of insulating material 26 and intermediate heating stations (not shown) are arranged at intervals along the pipeline 24.

Referring to FIG. 3, a nuclear reactor of the HTGR type is shown at 30. Helium in a primary circuit, emerges from the reactor 30 at a temperature of about 950° C and is conveyed in a closed primary circuit through a line 32 to a first heat exchanger 34, where it gives up heat to helium in a secondary circuit, the helium being cooled to a temperature of about 680° C upon leaving the heat exchanger 34. The helium in the primary circuit gives up further heat in a second exchanger 36, in series with the exchanger 34, and is cooled to a temperature of about 350° C, the helium emerging from the exchanger 36 being recycled to the nuclear reactor 30, through a recycling compressor 52. The heat extracted from the helium in the exchanger 36 is used in a thermal cycle to heat steam for the production of electrical energy.

The primary helium circuit is preferably kept at a pressure lower than that of the stream and that of the helium in the secondary circuit, in order to avoid the possibility of leakage of radioactive material in the event of a leak in the primary circuit.

The transfer of heat in the exchanger 36 occurs in two consecutive stages. In the first stage, steam entering the enchanger through a line 38 from the exhaust of a high pressure steam turbine 40 is superheated, and the superheated steam produced is fed, through a line 42, to a low pressure turbine 44.

In the second stage of the heat transfer superheated steam is produced at a high pressure and is conducted through a line 50 to the high pressure turbine 40.

The high and low pressure turbines 40 and 44 constitute respective sections of a single turbine and have a common shaft which drives an electrical generator, shown diagrammatically.

The low pressure steam exhausted from the low pressure turbine 44 is condensed in a condenser 48. Condensate is withdrawn from the condenser 48 by a pump 47 which feeds the condensate into the heat exchanger 36 through a line 46.

The heat of condensation of the steam exhausted from the low pressure steam turbine 44 is used, through an indirect heat exchange, to vaporize the liquid sulfur trioxide returned from the utilization plant 12 through a return line 54 corresponding to the return line 18 of FIG. 1.

This vaporization takes place in an evaporator 56 to which heat is supplied by a heat exchange fluid which is circulated by a pump 60 in a closed circuit, shown in broken outline. The pump 60 draws the heat exchange fluid from the evaporator 56, in which the fluid condenses, and passes the fluid through a line 58 to condenser 48 where the fluid is evaporated in the process of condensing the steam from the low pressure turbine 44, at a temperature of about 45° C, the evaporated heated fluid passing along a line 59 to the evaporator 56. The use of an indirect heat exchange for the evaporation of the sulfur trioxide is a safety measure to avoid contact between water and the sulfur trioxide.

Evaporation of the sulfur trioxide is carried out at slightly less than atmospheric pressure so as to achieve optimum heat transfer through the heat exchange fluid with the low pressure steam exhausted from the steam turbine 44 and in order to assist the subsequent dissociation thermodynamically.

The sulfur trioxide vapor is conveyed from the evaporator 56 through a line 62 to a dissociation reactor 68, the sulfur trioxide being heated in heat exchangers 65 and 66 prior to entry into the reactor 68, by means of the gaseous flow coming from the reactor 68 itself.

More particularly, in exchanger 64 heat exchange occurs between the gaseous stream flowing from the foot of the reactor 68 and a gaseous stream flowing in the same direction through the heat exchanger 64 from the reactor 56, preheating the latter gaseous stream in the line 62 to about 550° C. The gaseous flow in line 62 is connected to the head of the reactor 68 in which the sulfur trioxide is heated by the secondary circuit helium which has been heated in the heat exchanger 34 as described above.

The reactor 68 may contain a catalyst which assists the dissociation of the sulfur trioxide, in which case the catalyst should be arranged in a number of layers, separated by the helium carrying exchangers, as shown diagrammatically.

The helium drawn from the heat exchanger 34 in the secondary circuit flows along a line 70 and enters the reactor 68 at a temperature of about 910° C, the helium being recovered at the output of the reactor 68 at a temperature of about 600° C and at a pressure of the order of 65 atm. and returned to the heat exchanger 34 along a line 72 by a recycling compressor 74.

Thus, in the production plant 10, a direct heat exchange is effected in the production of the steam capable of driving the turbines 40, 44 and an indirect exchange (through a secondary helium circuit) is effected to supply the heat required for the dissociation of the sulfur trioxide in the reactor 68.

Under the above conditions, molar quantities, of the order of 85%, of the sulfuric trioxide are dissociated. The gaseous flow discharged at the foot of the reactor 68 through a line 76, at a temperature of about 870° C, is cooled rapidly in exchanger 64 to a temperature of about 600° C and then in exchanger 66 to about 400° C. The rapid cooling is necessary in order to avoid shift of the dissociation equilibrium towards a greater proportion of the dissociation products.

Further cooling of the gaseous stream from the reactor 68 is effected by heat exchange in a waste water boiler 78, which generates low pressure stream, withdrawn through a line 79, and subsequently in a water-cooled cooler 80.

The resulting sulfur dioxide is condensed from the gaseous stream and separated from the oxygen. This condensation is carried out in a series of compressor stages 82 with coolers interposed between successive compressor stages, preferably followed by a final cooler 83 which cools the stream to about −20° C. The coolant circulating in the cooler 83 may, for example, be derived from an ammonia absorption refrigeration cycle.

Condensate from the coolers, including the cooler 83, is collected in a line 84 and consists for the greater part (about 85% molar) of sulfur dioxide, the remainder being sulfur trioxide. Gaseous oxygen is extracted from the cooler 83 through a line 86, at a temperature of about 20° C and a pressure of about 15 atm., the oxygen containing a small quantity (typically 4%) of sulfur dioxide.

In view of the impossibility of completely dissociating the sulfur trioxide, some sulfur trioxide will inevitably be present with the sulfur dioxide produced. In practice a solution of the sulfur trioxide is recovered by taking advantage of the complete solubility of the latter in water under the pressure conditions of the process.

Figure 4:
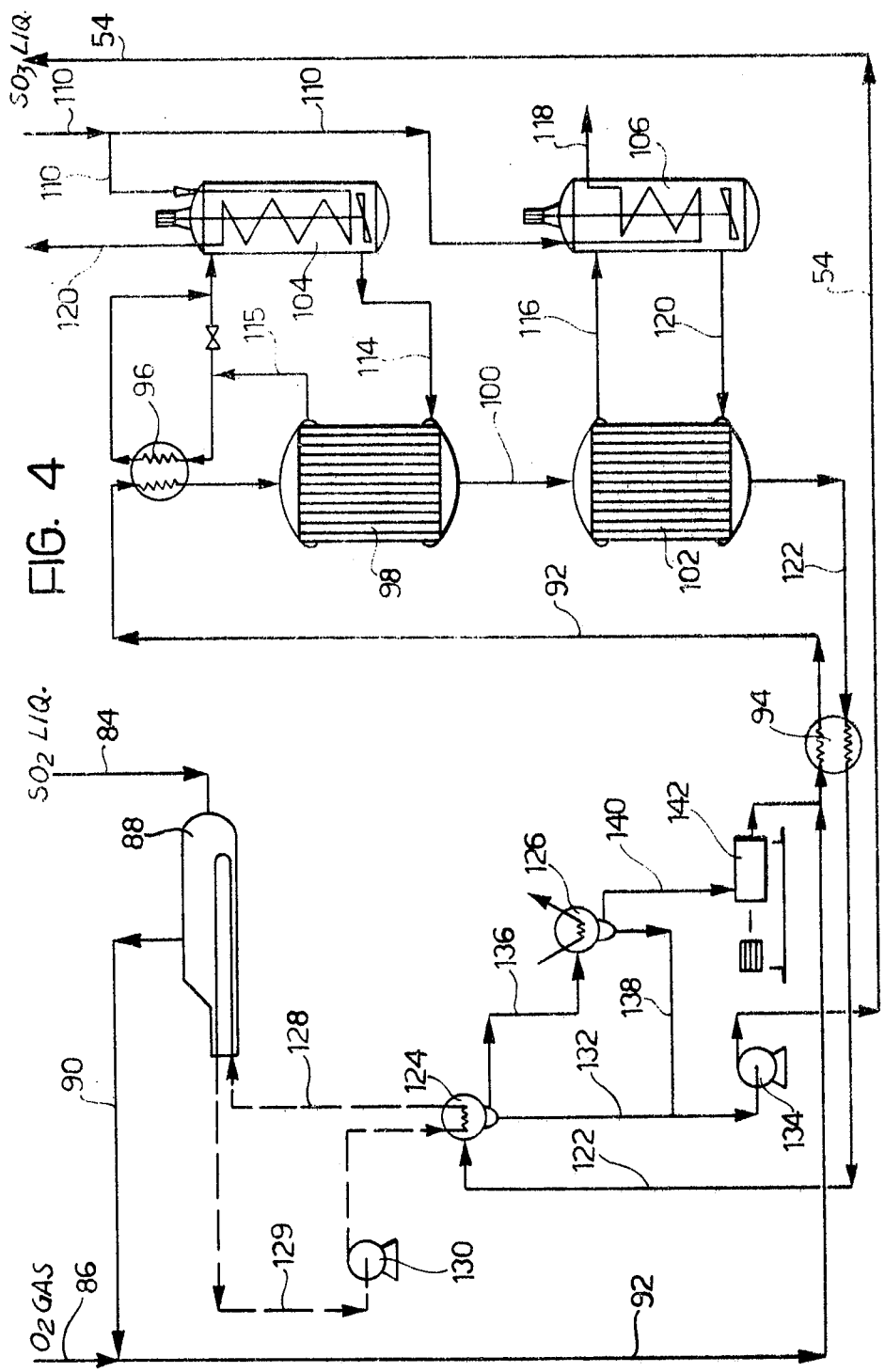
FIG. 4 is a more detailed representation of the utilization plant of FIG. 1.

The two resulting flow streams, the one of liquid sulfur dioxide in line 84 and the other of gaseous oxygen in line 86 are sent to the utilization plant, shown diagrammatically in FIG. 4, the lines 84 and 86 corresponding to the lines 14 and 16 respectively in FIG. 1.

Referring now to FIG. 4, the liquid sulfur dioxide coming from the production plant through the line 84, is first vaporized in an evaporator 88 by indirect heat transfer from the output flow of sulfur trioxide from reactors 98, 102 in which oxidation of the sulfur dioxide is carried out as hereinafter described.

The sulfur dioxide is fed from the evaporator 88 through a line 90, at a temperature of about 30° C and a pressure of the order of 6 atm., to be mixed with the flow of gaseous oxygen coming from the production plant through the line 86.

The resultant gaseous mixture is fed through a line 92 and preheated in heat exchangers 94 and 96 before entering the reactor 98. From the reactor 98 it is fed through a line 100 to the further reactor 102. The temperature of the gaeous flow at the inlet of the reactors 98 and 102 is of the order of 550° C and 500° C respectively.

The two reactors 98 and 102 are of the clustered tube type, containing a vanadium pentoxide based catalyst, and are cooled by means of the circulation of molten salts.

With further reference to FIG. 4, two successive cooling stages are provided in the form of respective superheated steam generators 104, 106 of the "once-through" type operating at two different pressures and connected to the reactors 98 and 102 respectively.

Typically, the molten salts drawn from the reactor 98 at a temperature of the order of 600° C are fed through a line 115 to the steam generator 104, water being fed into the generator 104 through a line 110 and heated. Superheated steam at high pressure is withdrawn from the generator 104 through a line 120, and the molten salts, cooled to 400° C, are recycled to the reactor 98 through line 114.

Similarly the molten salts drawn from the reactor 102, at a temperature of the order of 450° C, are conveyed to the second steam generator 106 through line 116. Water is fed into the generator 106 through line 110 and superheated steam at medium pressure is withdrawn through a line 118. The molten salts, cooled to about 350° C, are recycled to the reactor 102 through a line 120.

Practically complete conversion of the sulfur dioxide to sulfur trioxide is achieved in the reactors 98 and 102 as a result of the high partial pressures of the reagents. Conversion is further assisted by maintaining an excess molar concentration of oxygen with respect to sulfur dioxide in the reactors 98 and 102.

The resulting gaseous outflow from the reactor 102 therefore consists of sulfur trioxide, the excess oxygen and small quantities of uncovered sulfur dioxide. This mixture, after cooling in the heat exchanger 94, is condensed in condensers 124 and 126 to separate the sulfur trioxide contained therein.

In the condenser 124 cooling is carried out by means of an intermediate heat exchanger fluid, pumped by means of a pump 130 in a closed circuit (shown in broken outline) including lines 128, 129, the condenser 124 and the evaporator 88. The heat exchange fluid transfers heat from the condenser 124 for the evaporation of the sulfur dioxide in the evaporator 88.

Partial separation of the sulfur trioxide is carried out in the condenser 124, operating at 80° C, the liquid sulfur trioxide being withdrawn through a line 132. The uncondensed fraction passes through line 136 and is condensed in a water-cooled condenser 126.

The liquid sulfur trioxide from the condenser 126 is fed through a line 138 to join that drawn from the condenser 124 and the resulting united flow is pumped by a pump 134 to the production plant through a line 54 corresponding to the return line 18 of FIG. 1.

The uncondensed gases, comprising sulfur dioxide and oxygen, with small quantities of sulfur trioxide, are withdrawn through a line 140 and fed into the gaseous stream in the line 92 through an electric motor-driven compressor 142.

What is claimed is:
1. A process for the conversion, conveyance and utilization of energy in a closed cycle in which thermal energy is converted, in a production plant, into chemical dissociation energy by dissociating sulfur trioxide according to the reaction:

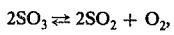

$$2SO_3 \rightleftarrows 2SO_2 + O_2,$$

the dissociation products of the reaction are conveyed to a utilization plant in which they are recombined into sulfur trioxide, with release of the stored chemical energy as heat, the resulting sulfur trioxide being returned to the production plant, and in which the sulfur dioxide and the sulfur trioxide are conveyed from the production plant to the utilization plant and from the utilization plant to the production plant respectively in liquid form wherein the liquid sulfur dioxide and sulfur trioxide are conveyed through pipes which are surrounded by a duct in which the gaseous oxygen flows.

2. The process defined in claim 1, in which the sulfur trioxide is dissociated by means of thermal energy produced by a nuclear reactor.

3. The process defined in claim 1, in which the thermal energy released in the utilization plant in the recovery of the sulfur trioxide from its dissociation products is used for the production of high pressure superheated steam.

* * * * *